(12) United States Patent
Stump et al.

(10) Patent No.: US 12,421,124 B2
(45) Date of Patent: *Sep. 23, 2025

(54) SEPARATION AND PURIFICATION OF RARE-EARTH ELEMENTS BY CHEMICAL REDUCTION IN AQUEOUS SOLUTIONS

(71) Applicant: Winston-Salem State University, Winston-Salem, NC (US)

(72) Inventors: Nathan Aaron Stump, Chapel Hill, NC (US); Jafar Gharavi Naeini, Winston-Salem, NC (US)

(73) Assignee: Winston-Salem State University, Winston-Salem, NC (US)

( * ) Notice: Subject to any disclaimer, the term of this patent is extended or adjusted under 35 U.S.C. 154(b) by 1214 days.

This patent is subject to a terminal disclaimer.

(21) Appl. No.: 17/215,085

(22) Filed: Mar. 29, 2021

(65) Prior Publication Data
US 2021/0371290 A1    Dec. 2, 2021

Related U.S. Application Data

(63) Continuation of application No. 16/884,467, filed on May 27, 2020, now Pat. No. 10,988,386.

(51) Int. Cl.
*C01B 35/12* (2006.01)

(52) U.S. Cl.
CPC .......... *C01B 35/125* (2013.01); *C01B 35/127* (2013.01)

(58) Field of Classification Search
None
See application file for complete search history.

(56) References Cited

U.S. PATENT DOCUMENTS

| | | | |
|---|---|---|---|
| 5,030,424 A | 7/1991 | Fulford et al. | |
| 9,228,248 B2 | 1/2016 | Sugita et al. | |
| 9,376,736 B2 | 6/2016 | Miyata et al. | |
| 10,246,759 B2 | 4/2019 | Sugita et al. | |
| 2010/0065780 A1* | 3/2010 | Buissette | C09K 11/778 |
| | | | 252/301.36 |
| 2017/0306439 A1* | 10/2017 | Freiderich | C22B 3/286 |

OTHER PUBLICATIONS

Stump et al. Novel Preparation and Characterization of Divalent Samarium: Barium Octoborate; Chem. Lett.; 45, 1120-1122; 2016.*

(Continued)

*Primary Examiner* — Guinever S Gregorio
(74) *Attorney, Agent, or Firm* — NK Patent Law

(57) ABSTRACT

The subject matter described herein includes a method of separating a mixture of trivalent rare-earth elements, based on their reduction potential, and solubility in a divalent state. The method includes adding the mixture of trivalent rare-earth elements to a tetraborate salt with deionized water to form a salt mixture, grinding the salt mixture with boric acid to form a solid mixture, wetting the solid mixture with water to form a paste, heating the paste to form a resultant product, dissolving the resultant product, thereby creating a residual solid in aqueous solution, wherein the residual solid includes a second mixture of trivalent rare-earth elements, and the aqueous solution includes a substantially singular element of a divalent rare-earth element in an aqueous state, and removing the residual solid, thereby separating the divalent rare-earth element from the mixture of trivalent rare-earth elements.

7 Claims, 10 Drawing Sheets

(56) References Cited

OTHER PUBLICATIONS

Ullah, I., et al., "Luminescence properties of Sm3+ doped Na2B4O7 glasses for lighting application", Elsevier, Journal of Luminescence, vol. 230, Feb. 2021, 8 pages.
Elgendy, Khaled, et al., "Analytical applications using spectrophotometric technique for the determination of uranium (VI), samarium(III) and cerium(III) by new organic reagent", Journal of the Iranian Chemical Society, 2020, vol. 17, 11 pages.
Maa, J., et al., "The fluorescence of Sm3+ in lithium molybdate borate glasses", Journal of Luminescence, vol. 62, Issues 3-4, Oct. 1994, 2 pages.

\* cited by examiner

SEPARATION AND PURIFICATION OF RARE-EARTH ELEMENTS BY CHEMICAL REDUCTION IN AQUEOUS SOLUTIONS

CROSS-REFERENCE TO RELATED APPLICATION

This application is a continuation application of U.S. Non-Provisional patent application Ser. No. 16/884,467, filed on May 27, 2020, the entire content of which is incorporated herein by reference.

TECHNICAL FIELD

The presently disclosed subject matter is directed towards systems and methods of separating and purifying rare-earth elements. Specifically, the presently disclosed subject matter is directed towards separating and purifying rare-earth elements by chemical reduction in aqueous solutions. More specifically, the presently disclosed subject matter is directed towards the solubility of various rare-earth elements when reduced in the presence of borate matrices, at relatively low temperatures.

BACKGROUND

The separation of rare-earth elements has always proven to be difficult because of the similarity of the properties associated with the various rare-earth elements. One such property is the prevalence of the trivalent oxidation state for all rare-earth ions. However, if there were a simple method to change the valence state of those ions, which are most easily reduced to the divalent state (e.g. Eu, Yb, Sm, and Tm), a better separation method could present itself. Some methods have proven successful for small samples, but only using toxic reducing methods that are not conducive for commercial scale separations. Previous methods also resulted in a lower purity final product, or were prohibitively expensive and complicated to be commercially feasible.

What is needed is an environmentally friendly, simple, cost-effective, energy efficient, and commercially scalable method for the separation and purification of rare-earth elements from each other. The presently disclosed subject matter provides improved systems and methods of separating rare-earth elements, which overcome the disadvantages of prior methods.

SUMMARY

This summary is provided to introduce, in a simplified form, concepts that are further described in the following detailed descriptions. This summary is not intended to identify key features or essential features of the claimed subject matter, nor is it to be construed as limiting the scope of the claimed subject matter.

Disclosed herein is a method of isolating samarium (II) as $Sm^{2+}$ doped borate anions in aqueous solution comprising, obtaining at least one samarium salt having a formula $Sm_xA_y$, wherein A is an anion having a charge n according to a formula $3x=-ny$, where $n<0$; mixing the samarium salt in solution with at least one hydrated tetraborate salt complex to form a salt mixture, wherein the hydrated tetraborate salt complex has a formula $M_2B_4O_7 \cdot gH_2O$, wherein M is an alkali metal, and q represents a number of $H_2O$ molecules in the tetraborate salt complex; grinding the salt mixture with boric acid to form a solid mixture; heating the solid mixture to within a temperature range for a period of time to form a resultant product; dissolving the resultant product in water, thereby creating a residual solid in aqueous solution, wherein the residual solid comprises $Sm(III)(B_5O_6(OH)_4)_3(s)$, and the aqueous solution comprises $Sm^{2+}$ doped borate anions; and separating the residual solid from the $Sm^{2+}$ doped borate anions, thereby isolating the $Sm^{2+}$ doped borate anions in aqueous solution.

According to one or more embodiments, the samarium salt is $Sm(NO_3)_3$ [Sm(III) nitrate].

According to one or more embodiments, the hydrated tetraborate salt complex is $Na_2B_4O_7 \cdot 10H_2O$.

According to one or more embodiments, the temperature range is 350-800° C.

According to one or more embodiments, the method further comprises mixing the samarium salt in solution with approximately 5 ml of deionized water.

According to one or more embodiments, the method further comprises wetting the solid mixture with deionized water to form a paste.

According to one or more embodiments, the period of time is at least 10 minutes.

According to one or more embodiments, the method further comprises drying the salt mixture for at least six hours, between 125-200° C., before grinding it with boric acid, thereby removing waters of hydration.

According to one or more embodiments, the salt mixture is ground with the boric acid at a mass ratio of 2:3 to create a stoichiometrically optimal ratio.

According to one or more embodiments, the $Sm^{2+}$ doped borate anions are contained in a hydrated sodium salt having a formula $Na((Sm(II):B_5O_6(OH)_4)) \cdot 3H_2O(aq)$.

According to one or more embodiments, a method of separating a mixture of trivalent rare-earth elements, based on their reduction potential and solubility in a divalent state, comprises, adding the mixture of trivalent rare-earth elements to a hydrated tetraborate salt with deionized water to form a salt mixture; grinding the salt mixture with boric acid to form a solid mixture; wetting the solid mixture with water to form a paste; heating the paste to form a resultant product; dissolving the resultant product, thereby creating a residual solid in aqueous solution, wherein the residual solid comprises a second mixture of trivalent rare-earth elements, and the aqueous solution comprises a substantially singular element of a divalent rare-earth element in an aqueous state; and removing the residual solid, thereby separating the divalent rare-earth element from the mixture of trivalent rare-earth elements.

According to one or more embodiments, the method further comprises drying the salt mixture, before grinding it with boric acid, thereby removing waters of hydration and excess water.

According to one or more embodiments, the salt mixture is ground with the boric acid at a mass ratio of between 1:1-1:4 to create a stoichiometrically optimal ratio.

According to one or more embodiments, a method of creating a high purity $Sm^{2+}_{(aq)}$ solution from a mixture of rare-earth elements containing trivalent samarium, comprises adding the mixture of rare-earth elements containing trivalent samarium to at least one tetraborate salt with water to form a salt mixture; grinding the salt mixture with a reducing agent to form a solid mixture; wetting the solid mixture to form a paste; heating the paste to form a resultant product; dissolving the resultant product, thereby creating a residual solid in aqueous solution, wherein the residual solid comprises a second mixture of rare-earth elements, and the aqueous solution comprises reduced $Sm^{2+}_{(aq)}$; and removing the residual solid, thereby creating the high purity $Sm^{2+}_{(aq)}$ solution.

According to one or more embodiments, the reducing agent is boric acid.

According to one or more embodiments, the method further comprises drying the salt mixture, before grinding it with boric acid, thereby removing waters of hydration and excess water.

According to one or more embodiments, the salt mixture is ground with the boric acid at a mass ratio from 1:1-1:4, to create a stoichiometrically optimal ratio.

According to one or more embodiments, the second mixture of rare-earth elements comprises $Sm(III)(B_5O_6(OH)_4)_3(s)$.

According to one or more embodiments, the at least one tetraborate salt is $Na_2B_4O_{7(aq)}$.

According to one or more embodiments, the reduced $Sm^{2+}_{(aq)}$ is encapsulated in a stabilizing borate matrix that is water soluble.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
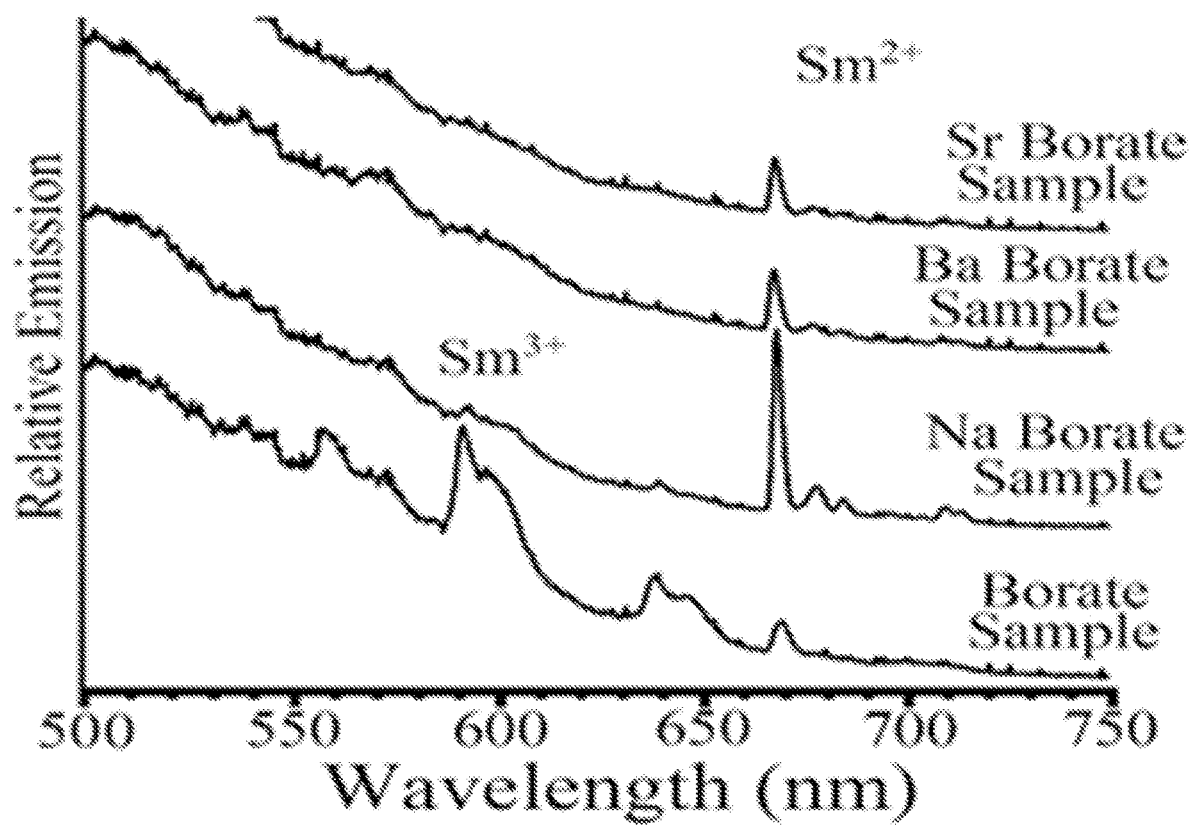
FIG. 1 is a graph of divalent samarium emission spectra, according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions should not be considered in a limiting sense, as it is understood that the present invention is in no way limited to only the embodiments illustrated.

Any dimensions expressed or implied in these descriptions are provided for exemplary purposes. Thus, not all embodiments within the scope of the descriptions are made according to such exemplary dimensions.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

Rare-earth elements are a group of seventeen chemical elements that occur together in the periodic table. The group consists of yttrium and the 15 lanthanide elements (lanthanum, cerium, praseodymium, neodymium, promethium, samarium, europium, gadolinium, terbium, dysprosium, holmium, erbium, thulium, ytterbium, and lutetium). Scandium is found in most rare-earth element deposits and is sometimes classified as a rare-earth element. The International Union of Pure and Applied Chemistry includes scandium in their rare-earth element definition. For the purposes of the present disclosure, scandium is considered a rare-earth element.

The rare-earth elements are all metals, and the group is also referred to as the "rare-earth metals". These metals have many similar properties, and that often causes them to be found together in geologic deposits. They are also referred to as "rare-earth oxides" because many of them are typically mined and sold as oxide compounds.

At least one embodiment of the presently disclosed subject matter is illustrated throughout the summary and description. Disclosed herein is a method of isolating samarium (II) $Sm^{2+}$ doped borate anions in aqueous solution. The method includes, obtaining at least one samarium salt having a formula $Sm_xA_y$, where A is an anion having a charge n according to a formula $3x=-ny$, where $n<0$. The samarium in this salt is present in a trivalent state. Samarium may be the only rare-earth element in the salt, or the salt may be a mixture of rare-earth element salts. The rare-earth elements will be present in a trivalent state. According to one or more embodiments, the samarium salt is $Sm(NO_3)_3$ [Sm(III) nitrate].

The samarium salt is mixed in solution with at least one tetraborate salt complex to form a salt mixture. The at least one hydrated tetraborate salt complex has a formula $M_2B_4O_7 \cdot gH_2O$, where M is an alkali metal, and q represents a number of $H_2O$ molecules in the tetraborate salt complex. The number of $H_2O$ molecules in the salt complex will often vary depending on the identity of the alkali metal. According to one or more embodiments, the tetraborate salt complex is $Na_2B_4O_7 \cdot 10H_2O$.

The salt mixture is ground together with boric acid to form a solid mixture, and then the solid mixture is heated to within a certain temperature range for a fixed period of time to form a resultant product. According to one or more embodiments, the solid mixture is heated for approximately 10 minutes. This reduction step is extremely temperature sensitive. Deviations above or below the temperature range can result in a loss of yield and purity. According to one or more embodiments, the temperature range is 350-800° C. According to yet another embodiment, the temperature range is 400-500° C. In one exemplary embodiment, the temperature is set to 450° C.

The resultant product is dissolved in water, thereby creating a residual solid in aqueous solution. The residual solid includes $Sm(III)(B_5O_6(OH)_4)_3(s)$, and the aqueous solution includes $Sm^{2+}$ doped borate anions. Depending on the identity of M, the alkali metal present in tetraborate salt complex, the $Sm^{2+}$ doped borate anions are stable in solution with the alkali metal cations. This is unexpected since in an aqueous solution water should easily oxidize free divalent samarium back to the trivalent state. Therefore, it was determined that the divalent samarium is being encapsulated in a stabilizing borate matrix that is water-soluble. Furthermore, residual trivalent samarium resulting from the process proved to be insoluble, essentially separating the divalent rare-earth metal from the trivalent rare-earth metal. The residual solid, trivalent samarium is then separated from the $Sm^{2+}$ doped borate anions, thereby creating a highly pure aqueous solution of $Sm^{2+}$ doped borate anions.

According to one or more embodiments, the method also includes mixing the samarium salt in solution with approximately 5 ml of deionized water. The salt mixture may also be stirred to promote homogeneity. According to one or more embodiments, the method also includes wetting the solid mixture with deionized water to form a paste.

According to one or more embodiments, the method also includes drying the salt mixture for at least six hours, between 125-200° C., before grinding it with boric acid, thereby removing waters of hydration. According to one or more embodiments, the salt mixture was dried at 165° C. overnight.

According to one or more embodiments, the salt mixture is ground with the boric acid at a mass ratio of 2:3 to create a stoichiometric ally optimal ratio. In one exemplary embodiment, using ratios of 1:1 (50% boric acid) through 1:4 (80% boric acid), divalent samarium was produced as well.

According to one or more embodiments, if the alkali metal M is sodium, the $Sm^{2+}$ doped borate anions are contained in a sodium salt having a formula $Na((Sm(II):B_5O_6(OH)_4)) \cdot 3H_2O(aq)$. According to one or more further embodiments, the $Sm^{2+}$ doped borate anions are $SmB_5O_8^-_{(aq)}$ and are contained in a sodium salt having a formula $Na((Sm(II):B_5O_6(OH)_4)) \cdot 3H_2O(aq)$.

A method of separating a mixture of trivalent rare-earth elements, based on their reduction potential, and solubility in a divalent state, is possible. Different rare-earth elements have different reduction potentials. It is possible therefore to create a continuous process by which rare-earth elements with the lowest reduction potential are reduced, become soluble, and are separated first. This process can be continued until only the rare-earth element with the highest reduction potential is left behind in the original mixture of trivalent rare-earth metals. The divalent rare-earth metal is able to remain in an aqueous solution, rather than being immediately oxidized by water, because it is enveloped, or encapsulated in a stabilizing borate matrix that is water soluble. This is what makes the separation possible, according to the presently disclosed subject matter.

This method of separation includes adding the mixture of trivalent rare-earth elements to a tetraborate salt with deionized water to form a salt mixture, grinding the salt mixture with boric acid to form a solid mixture, wetting the solid mixture with water to form a paste, and heating the paste to form a resultant product. The resultant product is then dissolved, thereby creating a residual solid in aqueous solution. The residual solid includes a second mixture of trivalent rare-earth elements, and the aqueous solution includes a substantially singular element of a divalent rare-earth element in an aqueous state. The substantially singular element, in the divalent state, will be the single rare-earth element, with the lowest reduction potential, that is left in the mixture of rare-earth elements.

The second mixture of trivalent rare-earth elements differs from the original mixture of trivalent rare-earth elements in that one of the rare-earth elements has been reduced, and now exists in its divalent form in the aqueous state. Finally, the residual solid is removed, thereby separating the divalent rare-earth element from the mixture of trivalent rare-earth elements.

According to one or more embodiments, the method also includes drying the salt mixture, before grinding it with boric acid, thereby removing waters of hydration and excess water. According to one or more embodiments, the salt mixture is ground with the boric acid at a mass ratio of between 1:1-1:4 to create a stoichiometrically optimal ratio. This ratio may be adjusted based on the content of the salt mixture.

According to one or more embodiments, a method of creating a high purity $Sm^{2+}_{(aq)}$ solution from a mixture of rare-earth elements containing trivalent samarium is disclosed. The mixture of rare-earth elements may be from ores that contain rare-earth oxides. The ore may be mined or commercially available. The divalent solution created is high purity because it is substantially a singular element. This method can be repeated to further isolate and purify the divalent solution.

The method includes adding the mixture of rare-earth elements containing trivalent samarium to at least one tetraborate salt with water to form a salt mixture, grinding the salt mixture with a reducing agent to form a solid mixture, wetting the solid mixture to form a paste, and heating the paste to form a resultant product. The resultant product is then dissolved, creating a residual solid in aqueous solution. The residual solid includes a second mixture of rare-earth elements, and the aqueous solution includes reduced $Sm^{2+}_{(aq)}$. The residual solid is then removed, creating the high purity $Sm^{2+}_{(aq)}$ solution.

According to one or more embodiments, the reducing agent is boric acid. According to one or more embodiments, the method also includes drying the salt mixture, before grinding it with boric acid, thereby removing waters of hydration and excess water. In one exemplary embodiment, the salt mixture is ground with the boric acid at a mass ratio from 1:1-1:4, to create a stoichiometrically optimal ratio.

According to one or more embodiments, the second mixture of rare-earth elements includes $Sm(III)(B_5O_6(OH)_4)_3(s)$, and the at least one tetraborate salt is $Na_2B_4O_{7(aq)}$. According to at least one embodiment, the reduced $Sm^{2+}_{(aq)}$ is encapsulated in a stabilizing borate matrix that is water soluble.

Working Examples

The examples that follow illustrate the reduction and subsequent separation of trivalent rare-earth elements utilizing the solubility, and unexpected stability, of their divalent forms in the presence of water due to being encapsulated or embedded in, the borate matrices. The following examples are intended to illustrate various aspects of the presently disclosed subject matter, and are not intended to be limiting in scope.

A trivalent samarium doped sodium borate reagent was prepared by the addition of $Sm(NO_3)_3$ solution to $Na_2B_4O_7 \cdot 10H_2O$ with additional deionized water. The mixture was stirred to promote homogeneity and dried at 165° C. overnight. A portion of the resultant solid was ground briefly (~1 min) with boric acid at a mass ratio of 2:3. The composite was placed on a porcelain tile, and wetted with deionized water to form a paste. A muffle furnace was heated to 450° C. The hot furnace was conditioned by the addition of a crucible containing deionized water. The tile was placed in the conditioned 450° C. furnace for 10 minutes. The resultant product exhibited significant expansion due to the release of gases and exhibited a tan color. While hot, the fired material and tile were carefully immersed in 100 ml boiling deionized water. The majority of the solid product immediately dissolved. A small amount of residual solid was separated from the supernatant. The clear aqueous solution was evaporated to about 15 ml volume and cooled. Samples of the undissolved solid residue, the solution, and product recrystallized from the solution were collected.

To identify the environment surrounding the divalent samarium site in the borate matrices, additional samples were prepared and fired for comparison. For example, $Sr_2B_6O_{11} \cdot 3H_2O$ and $Ba_2B_6O_{11} \cdot 3H_2O$ precipitates were mixed with boric acid at a mass ratio of 1:4. The samarium doped sodium borate reagent was fired and a small amount of water was added to the hot sample rather than dissolving it in excess water (this product was also soluble). Another sample started with samarium doped boric acid. This product was also wetted with a small amount of deionized water following a 10 minute firing at 450° C.

Emission spectroscopy provides an excellent method to identify divalent and trivalent samarium. The trivalent species exhibits multiple strong manifolds of overlapping features that are usually centered at 560, 600, and 645 nm. The emission associated with $Sm^{2+}$ usually includes several sharp emission features near 680, 700, 725, 760, and 810 nm corresponding to $^5D_0 \rightarrow ^7F$ electronic transitions. This is complicated in sodium borate samples since non-radiative de-excitation of the divalent samarium stops emission at room temperature. This limits the emission studies to samples that have been cooled. Therefore, emission was collected at both ambient sample temperature (298K) and when cooled by immersion in liquid nitrogen (77K). The samples can be excited with a diode laser at 405 nm (200 mW power). The emitted light was collected by a fiber-optic probe coupled to a miniature fiber-optic spectrophotometer (OCEAN OPTICS®, USB2000).

Using these methods produced divalent samarium in a water-soluble sodium borate matrix as identified by emission spectroscopy. When the material was dissolved, the divalent samarium was retained and stabilized in the aqueous state while residual trivalent samarium did not dissolve, effectively separating the two forms of samarium. Based on these findings, a similar separation of divalent lanthanides from trivalent species is possible.

The divalent samarium emission spectrum collected from a sample of 5% samarium doped into a strontium borate matrix is shown in FIG. 1. A similar sample of 5% samarium incorporated into a barium borate matrix is also shown in FIG. 1. The emission appeared to be indistinguishable regardless of the counter-ion incorporated in the material. The consistency of the emission pattern indicates the environment surrounding the divalent samarium site in both samples is identical. This would preclude the possibility that the samarium (II) ion is sitting in either the strontium or barium positions in the materials. Given the success of these preparations and the similarity of the emitting sites, a sodium borate sample was prepared without the presence of strontium or barium. The emission generated by samarium doped sodium borate at 77 K is also shown in FIG. 1 and exhibited an identical emission pattern. To simplify the process still further, an additional attempt to generate this divalent samarium site in a fired sample of pure boric acid was initiated. The final emission spectrum included in FIG. 1 was generated from a sample of pure boric acid to which a small amount of samarium(III) nitrate solution was added. The emission spectrum (FIG. 1) again confirmed the formation of the site, while also being characterized by significant residual trivalent samarium. In all four samples, samarium in an identical environment was reduced to the divalent state. This kind of reduction has not been reported for either sodium borate or boric acid samples.

The site in which the divalent samarium is located appears to be independent of the presence of the sodium, strontium, and barium ions in the materials and is thus dependent only on the borate matrix. Therefore, the $Sm^{2+}$ ions occupy boron sites in the systems. This species would remain consistent throughout the generation of the various systems. The occupation of the boron site by the much larger samarium ion is unexpected, however in the sodium borate and boric acid samples there is no other logical position for it to occupy.

Figure 2:
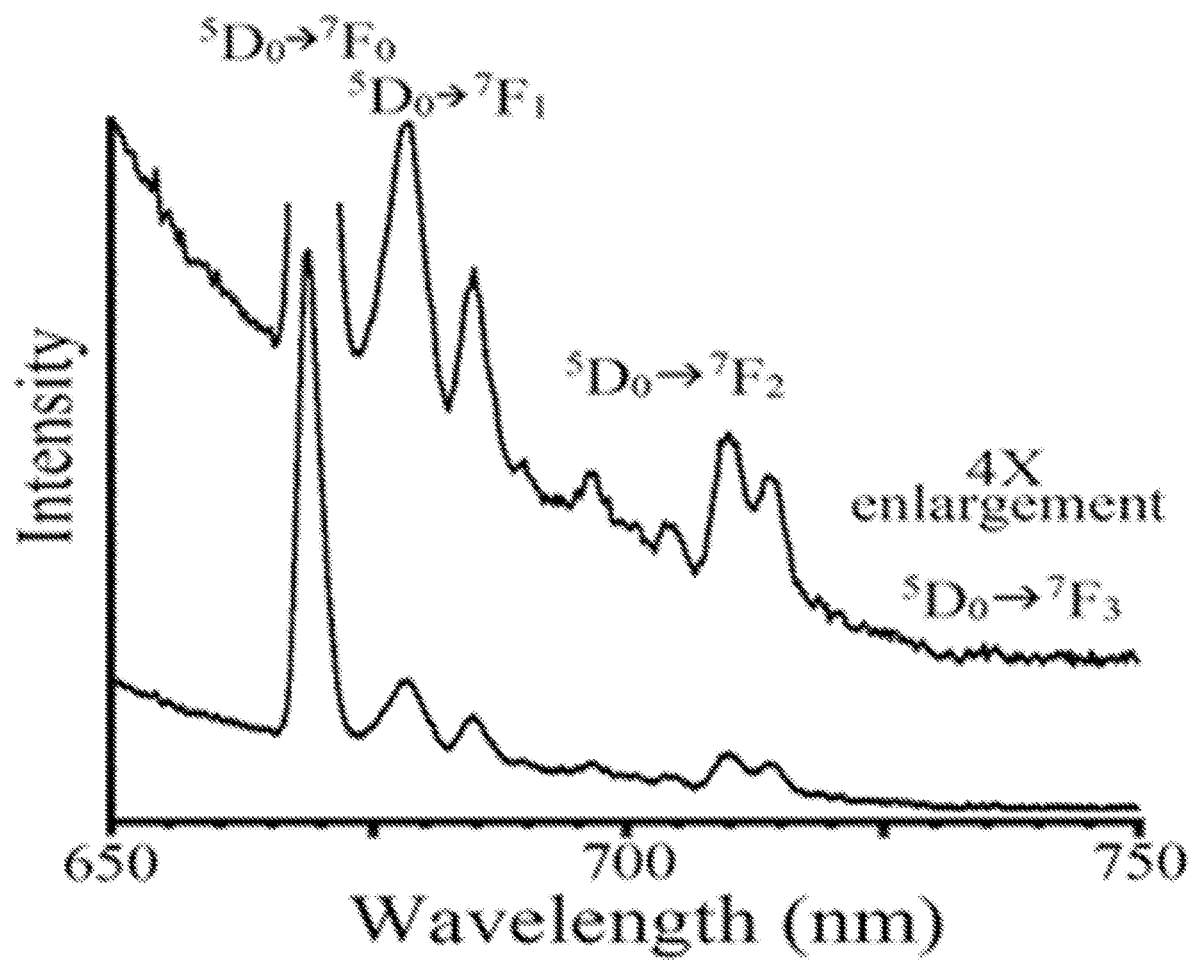
FIG. 2 is a graph of expanded emission spectra of samarium-doped sodium borate, according to one or more embodiments of the presently disclosed subject matter.

An enlargement of the emission generated by divalent samarium in the sodium borate sample is given in FIG. 2. The resolution of the emission spectrum for the sample is significantly poorer than other similar samples when determined under similar conditions, and appears to be intrinsic of the material rather than the spectrometer. This is likely a result of a plethora of vibrational levels in the system broadening the transitions. The wavelengths associated with the major emission features which can be specifically identified are compiled in Table 1, which lists the compilation of wavelengths (nm) of the major emission features characteristic of divalent samarium incorporated in sborgite (sodium pentaborate hydrate) cooled to 77 K.

TABLE 1

| Samarium (II) Emission Manifold | Wavelengths (nm) |
|---|---|
| $^5D_0$ to $^7F_0$ | 669 |
| $^5D_0$ to $^7F_1$ | 680, 685.5, 690 |
| $^5D_0$ to $^7F_2$ | 697, 706, 710.5, 714.5 |

Figure 3:
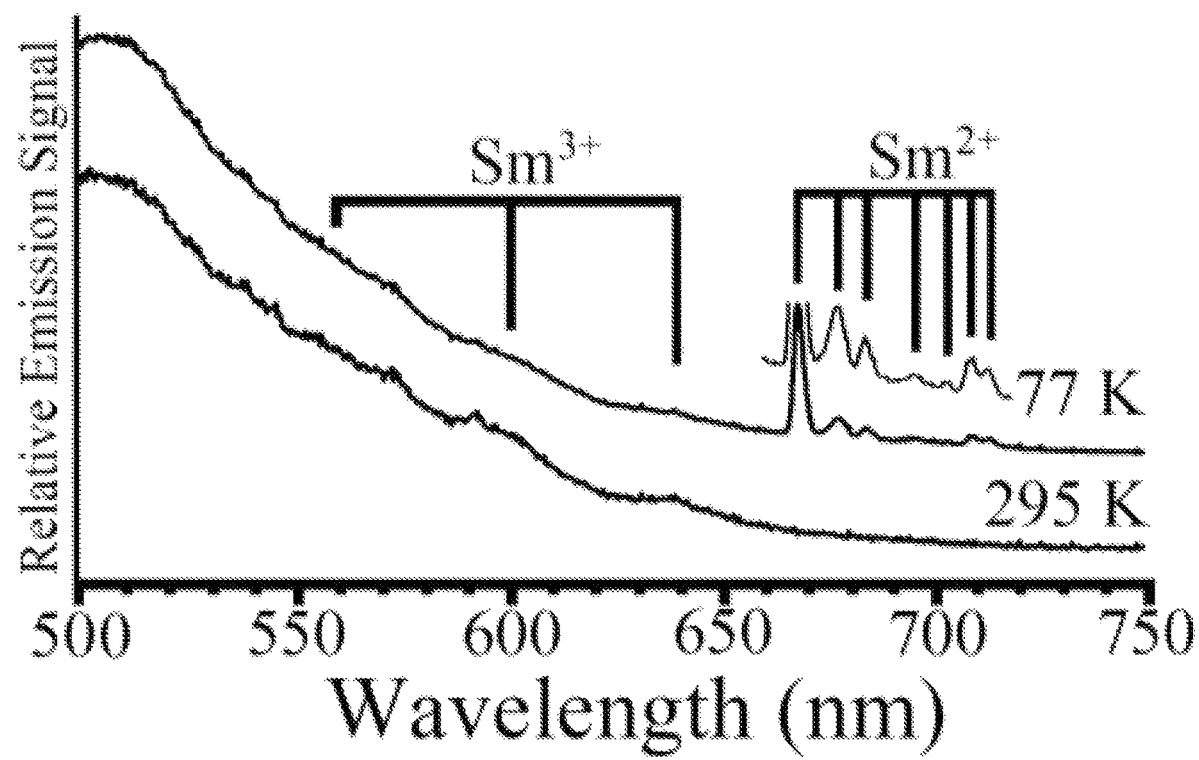
FIG. 3 is a graph of emission spectra collected from a samarium-doped sodium borate, according to one or more embodiments of the presently disclosed subject matter.

FIG. 3 shows the spectral range associated with both divalent and trivalent emission spectra collected at room temperature and at 77 K from a product prepared by wetting the hot fired sample composed of samarium doped sodium borate mixed with boric acid. Divalent samarium emission is readily apparent, but only when the sample is cooled to 77 K. A small fraction of trivalent samarium emission is also apparent at room temperature and when cooled. A broad blue-green phosphorescence is also observed that appears to be an attribute of the borate matrix. The appearance of divalent samarium emission upon cooling appears to be a function of thermally enhanced, non-radiative de-excitation that results in the quenching of the divalent samarium emission at ambient temperatures. These pathways are eliminated as the sample is cooled and the vibrational levels are depopulated. This may explain why divalent samarium has not been identified previously in similar samples.

If the sample is dissolved in deionized water instead of just wetted, a clear aqueous solution can be collected along with an undissolved residue. The emission spectra generated by the residue at room temperature and at 77 K (FIG. 4) are both consistent with a primarily trivalent samarium content, while that associated with the aqueous solution cooled to 77 K (FIG. 5) does not seem to show any trivalent samarium and appears to contain primarily divalent samarium. The divalent samarium emission pattern generated by the aqueous solution (FIG. 5) seems to be identical to that obtained from the solid sample (FIG. 3). This indicates that the coordination sphere surrounding the divalent samarium ion did not change when the material was dissolved. Therefore, the consistency of samarium's near environment, in conjunction with the solubility of the material, suggests that the samarium ion in the sodium borate matrix likely occupies a position in an anionic borate component with a composition of $Na(Sm(II)B_xO_y)$ for the sodium salt. The samarium contained in the salt is initially formed in the fired solid, retained in the dissolution of the solid, and is maintained in aqueous solution. The isolation of the samarium ion within the borate anion results in the stabilization of its divalent state. A divalent lanthanide ion that is stable in an aqueous solution is a rarity.

Figure 5:
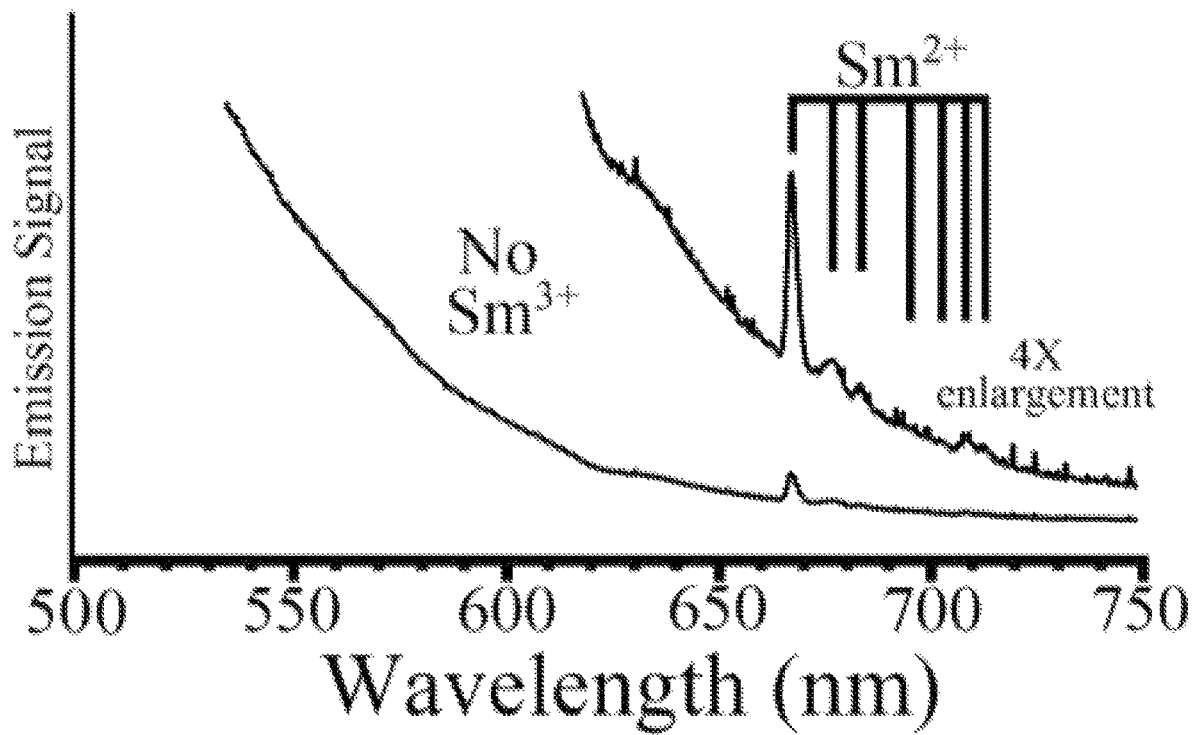
FIG. 5 is a graph of emission spectrum from a frozen aqueous solution prepared from a samarium doped sodium borate sample, according to one or more embodiments of the presently disclosed subject matter.
Figure 6:
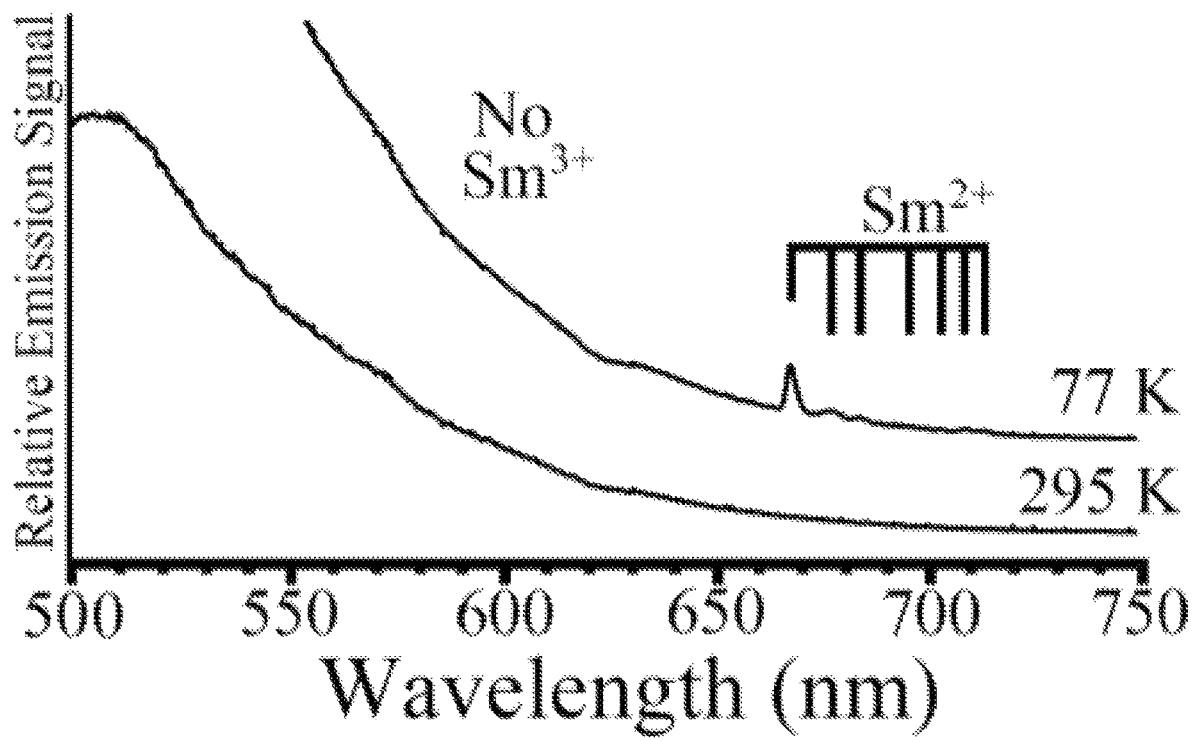
FIG. 6 is a graph of emission spectra collected from a product recrystallized from an aqueous solution prepared from a samarium doped sodium borate sample, according to one or more embodiments of the presently disclosed subject matter.
Figure 7:
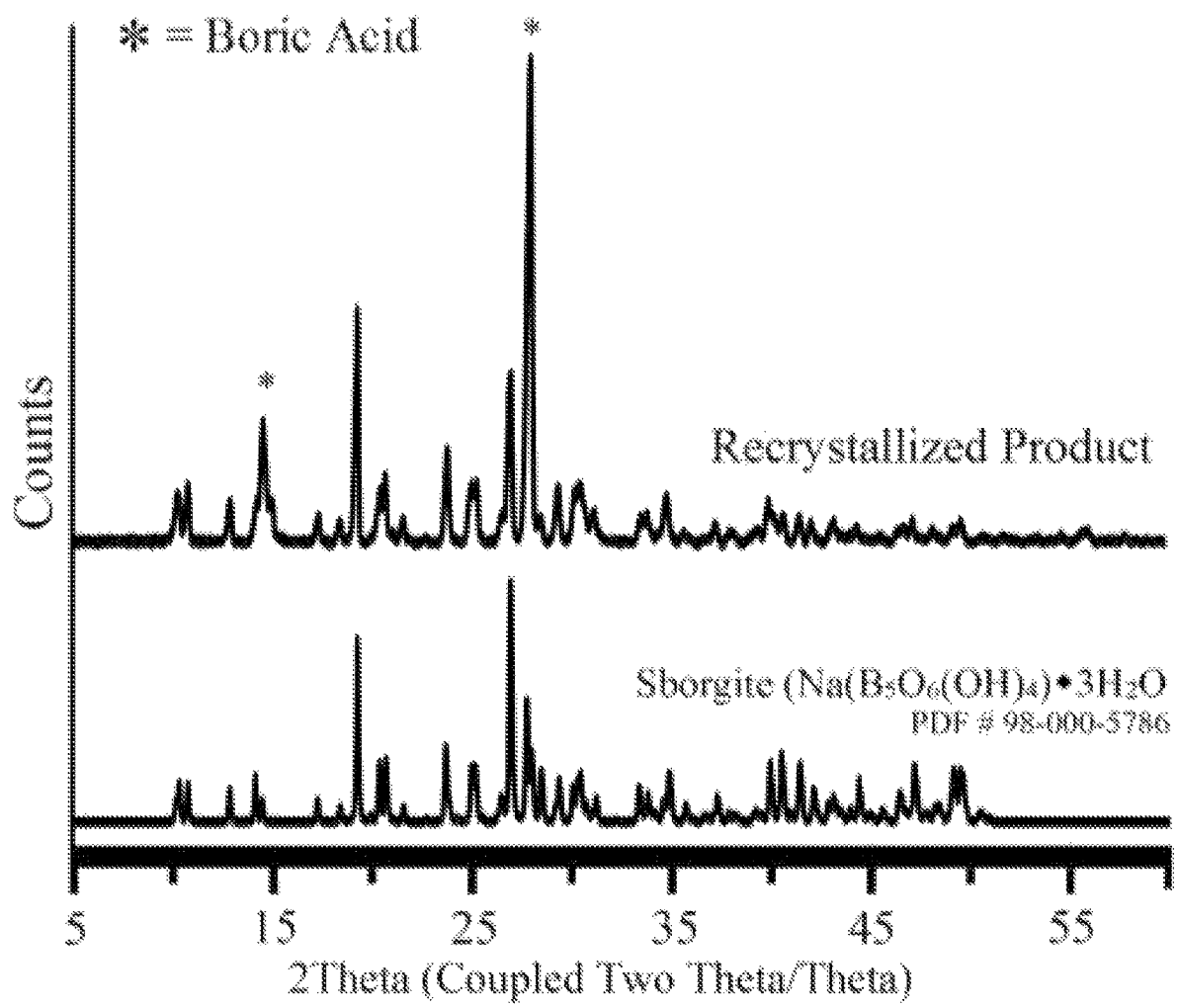
FIG. 7 is a graph of an x-ray diffraction pattern of the product recrystallized from an aqueous solution prepared from a samarium doped sodium borate sample, according to one or more embodiments of the presently disclosed subject matter.

FIG. 6 shows the emission generated from a solid sample, which resulted from the recrystallization of the product after the aqueous solution was condensed. It was found that the product could be repeatedly dissolved (with dilution and heat) and recrystallized (with evaporation) without any variation in the divalent samarium emission, and that the emission pattern was consistent with that obtained from the original product (FIG. 3) and aqueous solution (FIG. 5). An x-ray diffraction powder pattern was collected from the recrystallized sample and is shown in FIG. 7. It was determined that the sample is composed primarily of a synthetic form of sborgite (PDF #98-0005786) along with some unreacted boric acid. The powder pattern of sborgite is also included in FIG. 7.

Figure 8:
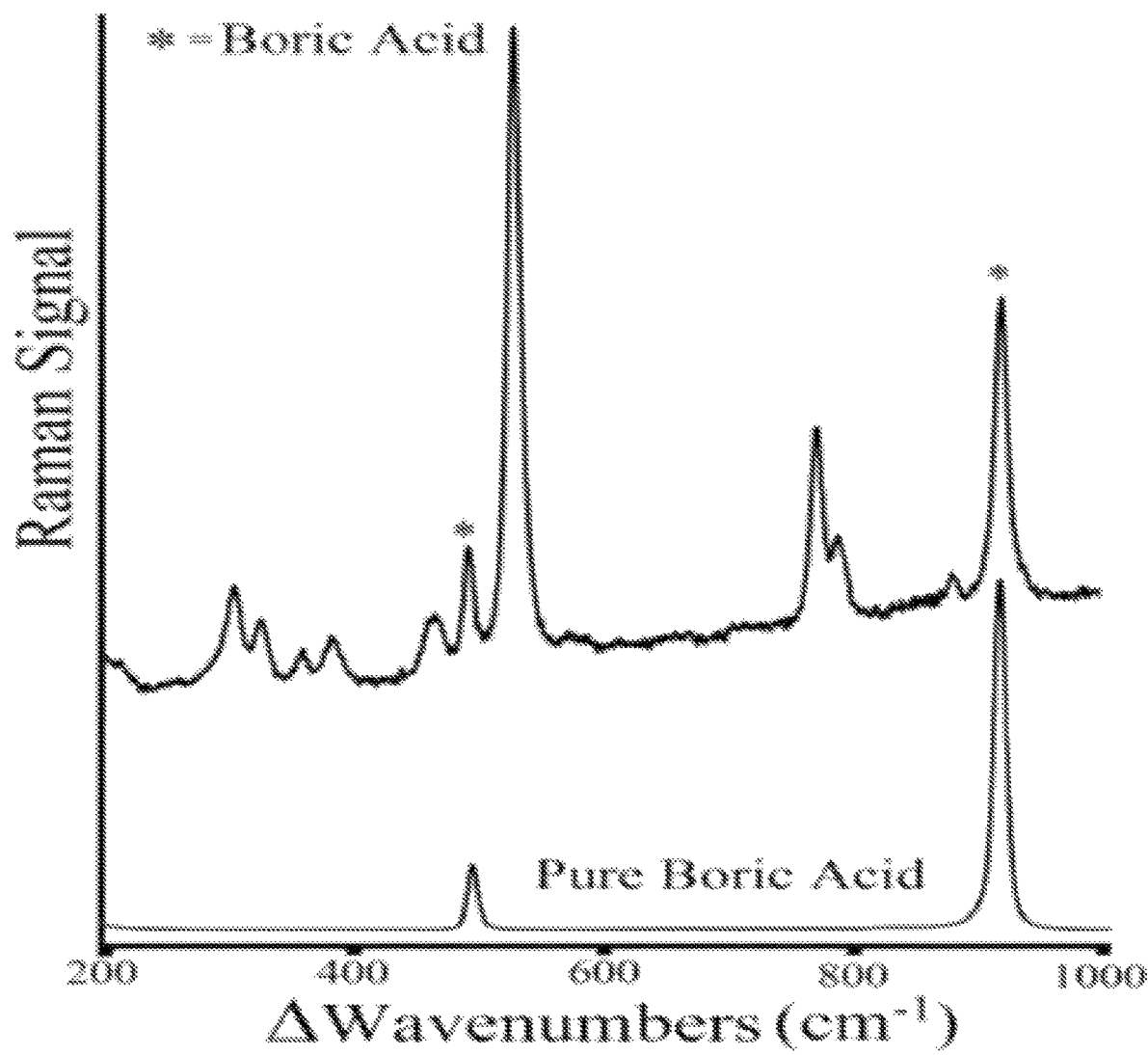
FIG. 8 is a graph of Raman spectra collected from a product recrystallized from an aqueous solution prepared from a samarium doped sodium borate sample, according to one or more embodiments of the presently disclosed subject matter.

To reconfirm the formation of synthetic form of sborgite, Raman scattering spectrum that was collected from the recrystallized product is included in FIG. 8. The spectrum is consistent with that reported in the literature for sborgite while including features associated with additional boric acid (the Raman spectrum associated with pure boric acid is included in FIG. 8 comparison).

Sborgite has a composition of $Na(B_5O_6(OH)_4) \cdot 3H_2O$. This formula is consistent with the preparation of the sample using a 2:3 mass ratio of doped sodium borate reagent with boric acid. This ratio results in approximately 4.5 boron atoms for each sodium atom in the system. Given the formation of $Na(B_5O_6(OH)_4) \cdot 3H_2O$ as the product, the anionic borate ion discussed previously can be proposed as the pentaborate ion $(B_5O_6(OH)_4^{-1})$. A ratio of five boron atoms per sodium atom is needed to stoichiometrically generate the sborgite matrix. Since the ratio at which the material was prepared was only 4.5:1, there was a shortage of boron atoms in the system. This shortage was further enhanced due to residual boric acid being present in the product (as indicated by the x-ray data). This shortage of boron atoms supports the assumption that the lack of boron in the system is forcing the samarium to replace a portion of the boron atoms in the pentaborate ion. This also suggests that the emitting samarium ion is occupying a boron site in the pentaborate anion.

The separation of the divalent and trivalent samarium in the system appears to result from variations in the solubility associated with incorporation of divalent and trivalent samarium in the system. The Sm(II) doped Na(B$_5$O$_6$(OH)$_4$)·3H$_2$O proved to be very soluble in water. The trivalent samarium is in the form of an insoluble Sm(III)(B$_5$O$_6$(OH)$_4$)$_3$ component of the system. The generation of this component is enhanced as the sodium content is decreased and the samarium ion assumes the role of counter-ion for the borate anion.

Figure 9:
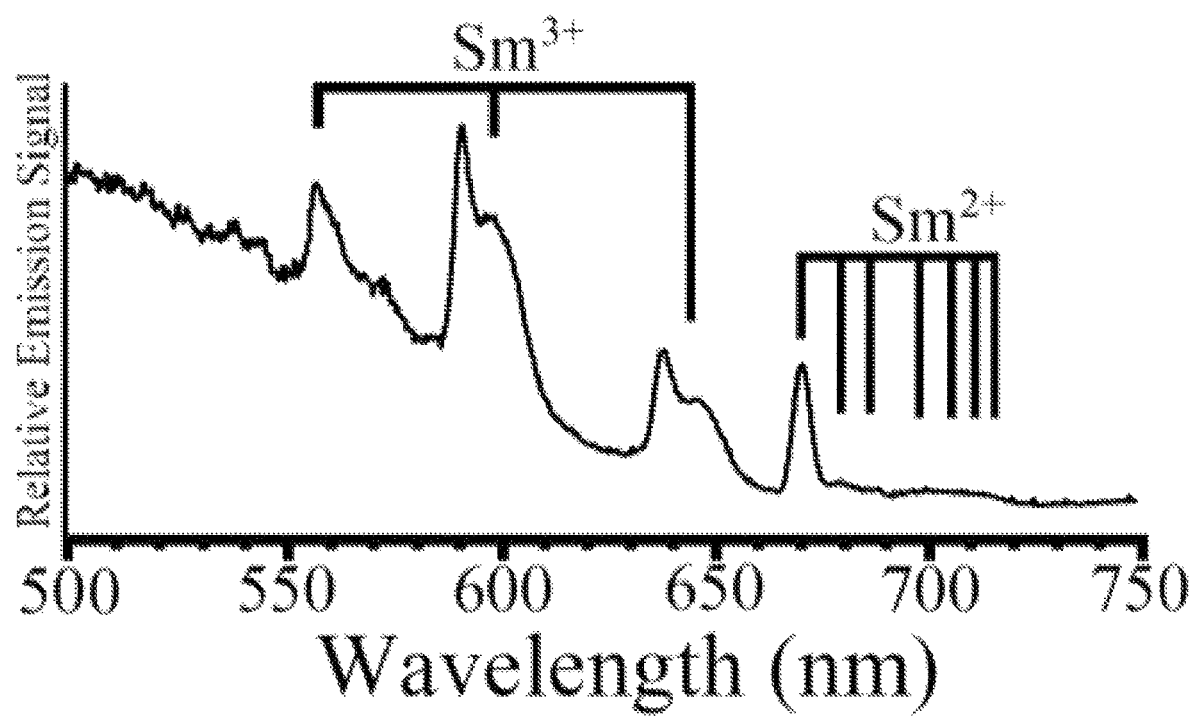
FIG. 9 is a graph of emission spectrum from a sample prepared from samarium(III) and boric acid, according to one or more embodiments of the presently disclosed subject matter.

This is supported by the partitioning of the two valence states when samarium is doped into pure boric acid (no sodium cation) as suggested by the emission spectrum shown in FIG. 9, collected at a temperature of 77 K, of the sample prepared with samarium doped boric acid. When samarium was doped into a pure boric acid system, a large portion of the samarium in the product appears to remain trivalent, and exhibited an emission pattern very similar to that of the residual trivalent samarium identified in FIG. 4, meanwhile the remaining samarium appeared to be reduced and showed a divalent emission similar to that given in FIG. 3.

In the multiple attempts to produce a reduced product from this system, a large percentage of trivalent samarium was always present. In the absence of a cationic counter-ion for the borate anion, the trivalent samarium assumes the cationic position and is not reduced. The remaining samarium is reduced by incorporation into the borate anion (which stabilizes the divalent oxidation state). This results in the repetitive production of both divalent and trivalent samarium in the system with a composition of Sm(III)[Sm(II):B$_5$O$_6$(OH)$_4$)]$_3$.

The divalent state of the samarium ion incorporated within the pentaborate ion is stable in both the aqueous solution and in the solid product. However, this is not the case with further heating. If the recrystallized product which contains divalent samarium (FIG. 4) is heated to 850° C. for five minutes, the emission generated by the sample (FIG. 10) exhibits features primarily associated with trivalent samarium. High temperature heating of the product appears to destroy the stabilizing structure of the borate system allowing for the divalent samarium be oxidized to the trivalent state. There is a strong similarity between the trivalent samarium emission and that observed from the undissolved residue shown in FIG. 4, and that observed from the boric acid sample in FIG. 7. This similarity means that the samarium ion's occupancy of the site in the pentaborate ion is unstable at higher temperatures. The instability allows the samarium ion to assume the position of the counter-ion, to the borate anion, in the material when heated to higher temperatures.

Spectroscopy Data Confirming Results

FIG. 1 illustrates samarium emission spectra of fired samples of samarium doped strontium borate (top), barium borate (second), sodium borate (third), and boric acid (bottom) at 77K (405 nm excitation).

FIG. 2 illustrates expanded emission spectra of samarium doped sodium borate at 77 K covering the range associated with the $^5D_0$ to $^7F_{0-3}$ emission manifolds of divalent samarium (a portion of the spectrum has been enlarged (4×) to show minor features).

FIG. 3 illustrates emission spectra collected from a samarium doped sodium borate sample fired for 10 min at 450° C., then wetted with deionized water after firing (emission collected at room temperature and 77 K sample temperatures). When at room temperature (295 K) only samarium(III) is apparent. When cooled to 77 K, samarium (II) emission is thermally enhanced (a portion of the spectrum has been enlarged (4×) to show minor features).

Figure 4:
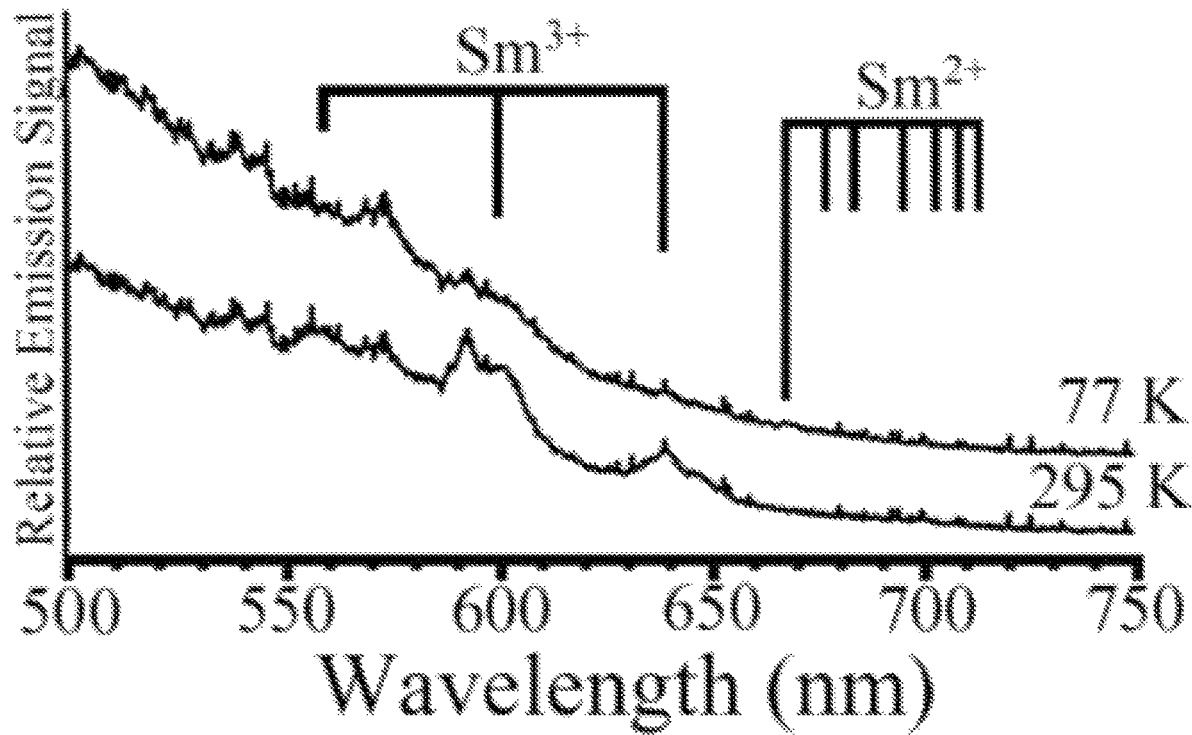
FIG. 4 is a graph of emission spectra collected from undissolved residue, according to one or more embodiments of the presently disclosed subject matter.

FIG. 4 illustrates emission spectra collected from the undissolved residue remaining after a samarium doped sodium borate sample was fired for 10 min at 450° C. then dissolved in deionized water (emission collected at sample temperatures of 295 K and 77 K). The observed emission results primarily from trivalent samarium.

FIG. 5 illustrates emission spectrum from a frozen aqueous solution prepared from a samarium doped sodium borate sample, fired for 10 min at 450° C. then dissolved in deionized water (emission collected at a sample temperature of 77 K). Only divalent samarium emission is apparent. The enlargement is included to show the minor divalent samarium features in the spectrum.

FIG. 6 illustrates emission spectra collected from a product recrystallized from an aqueous solution prepared from a samarium doped sodium borate sample, fired for 10 min at 450° C. then dissolved in deionized water (emission collected at a sample temperatures of 295 K and 77 K). No divalent or trivalent samarium emission was observed at room temperature (295 K). When cooled to 77 K only divalent samarium emission is apparent.

FIG. 7 illustrates x-ray diffraction pattern of the product recrystallized from an aqueous solution prepared from a samarium doped sodium borate sample, fired for 10 min at 450° C. then dissolved in deionized water (top) and Sborgite Powder Diffraction File #98-0005786 (bottom). A majority of the features of the product can be assigned to sborgite. Features associated with residual boric acid in the material are marked by stars.

FIG. 8 illustrates Raman spectra collected from the product recrystallized from an aqueous solution prepared from a samarium doped sodium borate sample, fired for 10 min at 450° C. then dissolved in deionized water (top) and from pure boric acid (bottom). A boric acid impurity in the product is denoted by stars FIG. 9 illustrates emission spectrum collected at 77 K from a sample prepared from samarium(III) and boric acid, which was fired for 10 min at 450° C. and wetted with deionized water. When prepared without sodium, a mixture of divalent and trivalent samarium emission is observed.

Figure 10:
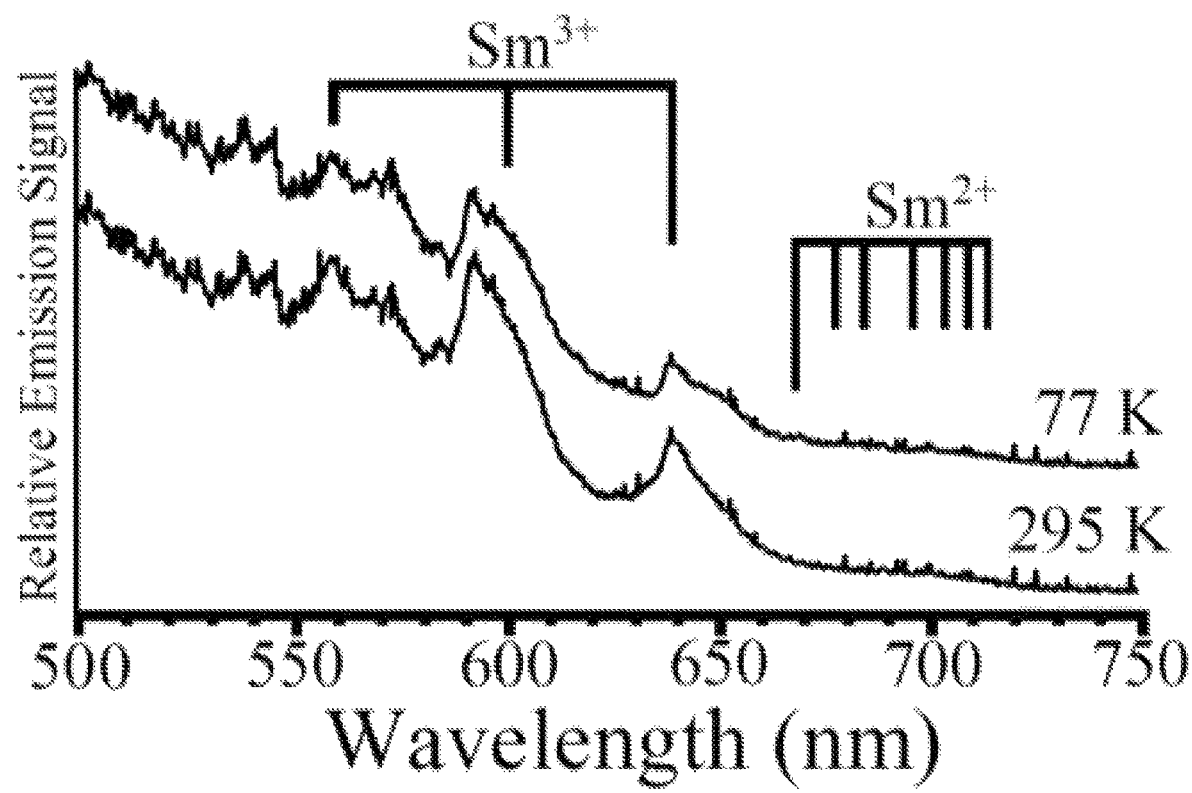
FIG. 10 is a graph of emission spectra collected from a recrystallized product from an aqueous solution prepared from a samarium doped sodium borate sample, according to one or more embodiments of the presently disclosed subject matter.

FIG. 10 illustrates emission spectra collected from a recrystallized product from an aqueous solution prepared from a samarium doped sodium borate sample, fired for 10 min at 450° C. then dissolved in deionized water melted at 850° C. (collected at 295 K and 77 K). All samarium appears to have been oxidized to the trivalent state.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Particular embodiments and features have been described with reference to the summary and descriptions. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A method of creating a high purity $Sm^{2+}_{(aq)}$ solution from a mixture of rare-earth elements containing trivalent samarium, the method comprising:
    adding the mixture of rare-earth elements containing trivalent samarium to at least one tetraborate salt with water to form a salt mixture;
    grinding the salt mixture with a reducing agent to form a solid mixture;
    wetting the solid mixture to form a paste;
    heating the paste to form a resultant product;
    dissolving the resultant product, thereby creating a residual solid in aqueous solution,
    wherein the residual solid comprises a second mixture of rare-earth elements containing trivalent samarium, and the aqueous solution comprises reduced $Sm^{2+}_{(aq)}$; and
    removing the residual solid, thereby creating the high purity $Sm^{2+}_{(aq)}$ solution.

2. The method of claim 1 wherein the reducing agent is boric acid.

3. The method of claim 2, further comprising drying the salt mixture, before grinding it with boric acid, thereby removing waters of hydration and excess water.

4. The method of claim 3, wherein the salt mixture is ground with the boric acid at a mass ratio of between 1:1-1:4.

5. The method of claim 2, wherein the reduced $Sm^{2+}_{(aq)}$ is encapsulated in a stabilizing borate matrix that is water soluble.

6. The method of claim 1, wherein the second mixture of rare-earth elements comprises $Sm(III)(B_5O_6(OH)_4)_3(s)$.

7. The method of claim 1, wherein the at least one tetraborate salt is $Na_2B_4O_{7(aq)}$.

* * * * *